United States Patent [19]
Conway et al.

[11] Patent Number: 6,061,331
[45] Date of Patent: May 9, 2000

[54] METHOD AND APPARATUS FOR ESTIMATING SOURCE-DESTINATION TRAFFIC IN A PACKET-SWITCHED COMMUNICATIONS NETWORK

[75] Inventors: Adrian E. Conway, Fort Lauderdale, Fla.; Man Li, Bedford, Mass.

[73] Assignee: GTE Laboratories Incorporated, Waltham, Mass.

[21] Appl. No.: 09/124,196

[22] Filed: Jul. 28, 1998

[51] Int. Cl.[7] ............................. H04J 3/14; H04L 12/26; H04Q 11/04

[52] U.S. Cl. ...................... 370/232; 370/253; 370/400; 709/233

[58] Field of Search ...................... 370/229, 230, 370/231, 232, 235, 252, 253, 351, 389, 400, 465; 379/219, 220, 221; 709/232, 233, 234, 238

[56] References Cited

U.S. PATENT DOCUMENTS

| | | | |
|---|---|---|---|
| 4,979,118 | 12/1990 | Kheradpir | 379/220 |
| 5,289,462 | 2/1994 | Ahmadi et al. | 370/232 |
| 5,734,825 | 3/1998 | Lauck et al. | 709/232 |
| 5,781,531 | 7/1998 | Charny | 370/232 |

*Primary Examiner*—Alpus H. Hsu
*Attorney, Agent, or Firm*—Leonard Charles Suchyta

[57] ABSTRACT

A real-time process estimates the source-destination traffic matrix in a packet-switched communications network. The inputs for the process are a set of aggregate link traffic measurements and a set of source node traffic measurements. The process uses a novel and computationally efficient decomposition method to estimate the traffic matrix. The process also makes uses of Linear Programming (LP) methods to estimate the source-destination traffic matrix.

10 Claims, 4 Drawing Sheets

METHOD AND APPARATUS FOR ESTIMATING SOURCE-DESTINATION TRAFFIC IN A PACKET-SWITCHED COMMUNICATIONS NETWORK

BACKGROUND OF THE INVENTION

The present invention relates to packet-switched communications networks, and more particularly to the estimation of traffic between all sources and destinations for use in the engineering and planning of a packet-switched communications network.

Several tasks in the area of traffic engineering and capacity planning of packet-switched communications networks require knowledge of source-destination traffic demands. One such task is the expansion or modification of the network. Given an existing network, network planners project increases in traffic demands or changes in the existing demands and determine the necessary expansion or modification to the network to support the projected traffic. Such expansion or modification may involve changing the existing topology, re-sizing previously existing network elements, adding or removing switches and links, and re-routing previously existing traffic. In order to make such expansions or modifications to an existing network, existing source-destination traffic demands must be quantified. Indeed, in most commercially available network dimensioning and capacity planning software tools, source-destination traffic demands are among the primary design input parameters.

Another network planning task requiring knowledge of existing source-destination traffic demands is contingency planning. In contingency planning, network planners examine the effect of potential link or node failures on the performance of an existing network. In a contingency planning study, planners model the network and simulate network behavior by failing certain links or nodes. They then re-route the affected source-destination traffic and re-compute network performance.

Yet another network planning task requiring knowledge of source-destination traffic demands is the addition of spare capacity to an existing network. By adding spare capacity, in the event of a failure the affected traffic can be re-routed while maintaining required performance levels.

A basic problem in the network planning area is that in practice existing source-destination traffic demands in a large packet-switched network are difficult to quantity. The existing source-destination traffic demands may be measured directly if the Management Information Bases (MIBs) at access devices support traffic MIB variables on a per-connection basis. For example, in a frame relay access device that supports a MIB with MIB variables that count the number of octets sent on a particular Data Link Control Identifier (DLCI), one can directly measure the source-destination traffic demands. However, such MIB variables are not always supported. Moreover, in a large network several factors make measuring traffic between all the sources and destinations impractical, undesirable, or infeasible, including (i) overheads of counters that need to be updated continuously at network devices, (ii) message passing and processing overheads of network management protocols such as Simple Network Management Protocol (SNMP), and (iii) the large number of source-destination combinations in a large network. In general, as the size of a network increases, the number of source-destination traffic measurements that must be made grows as the square of the number of nodes.

While it is difficult to directly measure source-destination traffic demands, other quantities can be measured more easily. For example, traffic coming into the network from outside the network at each node can be measured easily. Also, it is more practical and more feasible to measure the aggregate packet traffic on point-to-point links rather than source-destination routes since (i) the number of links is usually not excessive even in large networks and (ii) standard MIBs support MIB variables that record the amount of traffic sent on a port (and therefore on a link, since every link must be connected to a port).

It is desirable, therefore, to provide a method for estimating source-destination traffic demands in a packet-switched communications network based on quantities that can be measured easily and/or directly, such as point-to-point link traffic and incoming node traffic.

Some methods for estimating source-destination traffic have been developed for circuit-switched networks. For example, M. Tu, "Estimation of Point-to-Point Traffic Demand in the Public Switched Telephone Network,"*IEEE Transactions on Communications*, 42, 2/3/4, pp. 840–845, 1994, describes an iterative solution for estimating the magnitude of source-destination traffic demands in a circuit-switching network during a particular measurement time period. The problem is reduced to that of finding a solution for a set of linear equations. Depending on the number of links in the network and the number of node traffic measurements that are used, the method finds either a minimum-norm exact, or least-squares solution. Shortcomings of this method are (i) the method uses measurements from only a single time period, (ii) the accuracy of the solution is in proportion to the network connectivity, and (iii) the method may provide solutions that are not physically valid since the minimum-norm and least-squares solutions are not constrained. N. Kim, "A Point-to-Point Traffic Estimation from Trunk-Group and Office Measurements for Large Networks," in *Proc. 13th International Teletraffic Congress*, A. Jensen and V. B. Iversen (Eds.), pp. 465—469, North-Holland, 1991, discusses a similar iterative method.

P. S. Min, M. V. Hedge, and A. Rayes, "Estimation of Exogeneous Traffic Based on Link Measurements in Circuit-Switched Networks," *IEEE Transactions on Communications*, 43, 8, pp. 2381–2390, 1995, presents a more sophisticated method for estimating source-destination traffic demands in circuit-switching networks. This method makes use of observed call holding time and link blocking information and solves constrained quadratic and non-linear optimizations to obtain physically valid solutions. However, the method considers only one measurement time period to keep the computational costs down. The method also assumes that no route consists of more than two links and that the traffic is bidirectional.

As explained, the existing methods are inadequate for estimating source-destination traffic in packet-switched networks for several reasons. First, they were developed specifically for circuit-switched networks, whose operation and traffic patterns are fundamentally different from those of packet-switched networks. Second, these methods use only a single time period measurement for the practical sake of limiting the computational requirements. Third, some of these methods are extremely complex because they require solving non-linear optimization problems. Fourth, some of these methods provide solutions that are physically invalid because they do not constrain the optimization problem.

It is desirable, therefore, to provide a method for estimating source-destination traffic developed specifically for packet-switched communications networks. It is also desirable to provide a method for estimating source-destination traffic that uses multiple time periods because multiple time periods provide more measurement data. It is further desirable to provide a simple method for estimating source-destination traffic that scales for large networks and multiple time periods. It is even more desirable to provide such a method that reduces a potentially large estimation problem into a set of smaller problems that can be solved efficiently in real time.

SUMMARY OF THE INVENTION

Methods and systems consistent with the present invention satisfy those desires and others not realized by conventional systems by estimating source-destination traffic in a packet-switching network utilizing a computationally efficient decomposition method. These methods rely on measurements made over multiple disjoint time periods of traffic coming into the network at each node and measurements of traffic on each link. The methods use these measurements to set up linear programming (LP) problems for finding an approximate source-destination traffic matrix that optimally fits the measured data.

A method consistent with the present invention determines, for each of a plurality of network links belonging to routes originating at source nodes, an estimate of a proportion of the link traffic rate corresponding to traffic originating from the source nodes over the plurality of time periods based on a link traffic rate measurement and a measurement of the rate of traffic coming into each source node during each time period; determines an estimate of a traffic rate proportion for traffic originating from each source node corresponding to traffic terminating at each destination node over the plurality of time periods based on the proportion of the link traffic rate corresponding to traffic originating from the source nodes for each of the plurality of links belonging to routes originating from the source nodes; and computes a rate of traffic from each source node to each destination node based on the source traffic rate measurement during each of the plurality of time periods and the traffic rate proportion for traffic originating from each source node corresponding to traffic terminating at each destination node over the plurality of time periods.

Systems are also provided for carrying out the methodologies of the present invention.

The above desires, and other desires, features, and advantages of the present invention will be readily appreciated by one of ordinary skill in the art from the following detailed description of the preferred implementations when taken in connection with the accompanying drawings.

DETAILED DESCRIPTION OF THE PREFERRED EMBODIMENTS

Methods consistent with the present invention estimate traffic between sources and destinations in a packet-switched network. Instead of directly measuring traffic between all sources and destinations, which is impractical, undesirable, or infeasible for large networks, methods consistent with the present invention estimate source-destination traffic using more easily measured quantities: the total traffic arriving at each network node from outside the network, and the total traffic on each link connecting two nodes in the network. Using these measurements, taken over multiple disjoint time periods, methods consistent with the present invention set up a set of LP problems that, when solved, ultimately estimate the proportion of traffic originating at each node i and terminating at each node j. These proportions, multiplied by the measured traffic arriving at each node from outside the network, yield an estimate of traffic from all sources to destinations in the network.

Figure 1A:
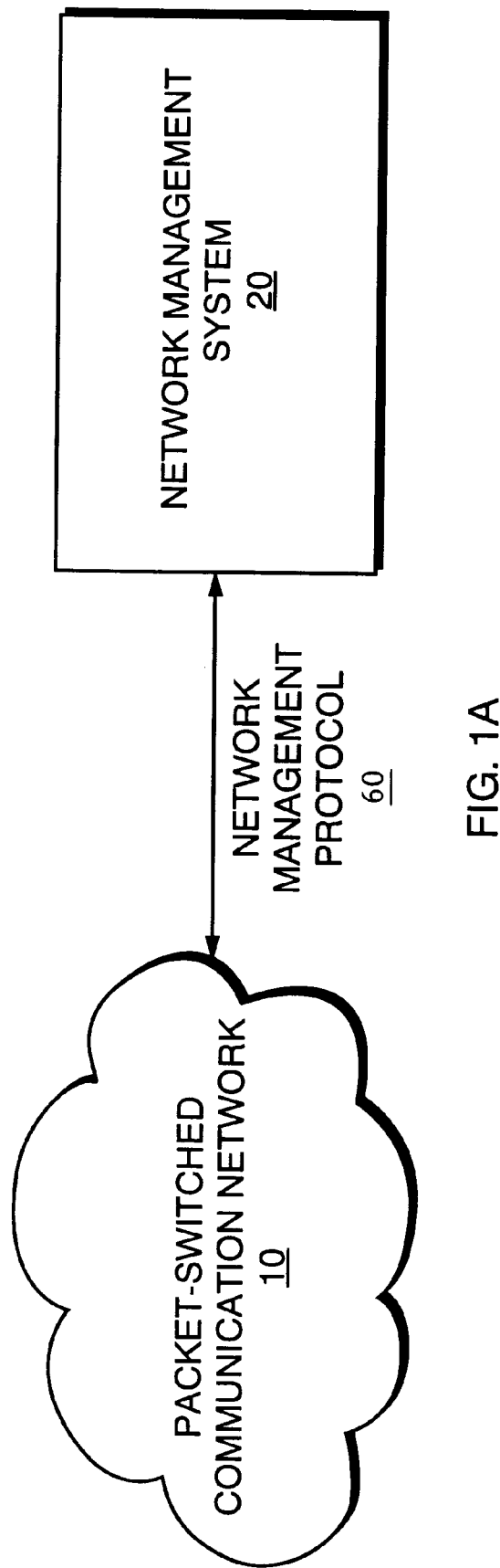
FIGS. 1A–B are high level diagrams of a packet-switched network and network management system in which a source-destination traffic estimation scheme consistent with the present invention may be implemented.
Figure 1B:
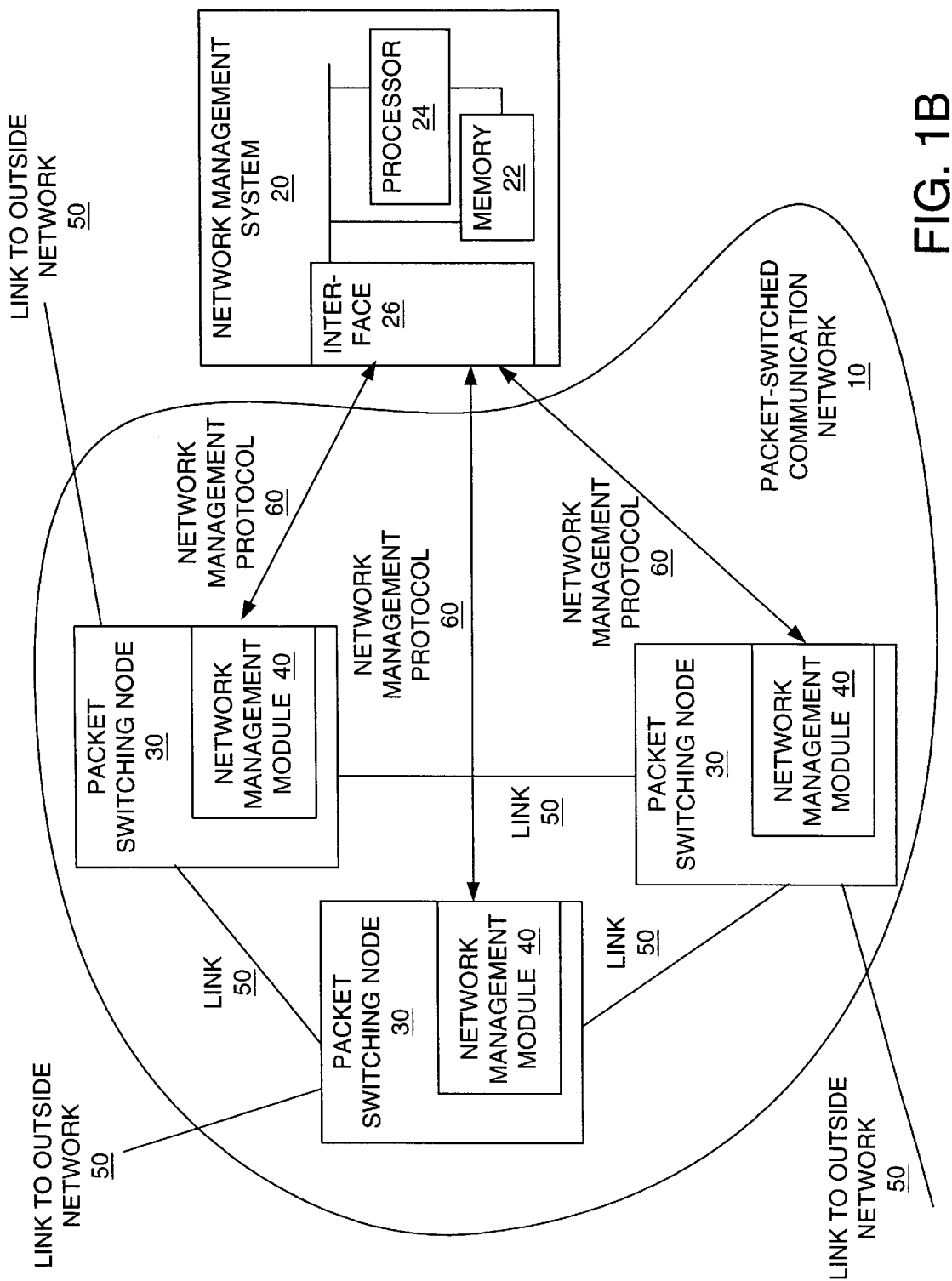

FIGS. 1A–B illustrate elements of a packet-switched communications network and network management system in which a method consistent with the present invention may be implemented. In general, network management system 20 performs network management functions for packet-switched communications network 10. Data used by network management functions is passed between network 10 and network management system 20 in-band over the network or over an out-of-band network, not specifically shown, using a network management protocol such as SNMP.

As shown in FIG. 1B, network management system 20 includes processor 24 and memory 22. A method for estimating source-destination traffic consistent with the present invention is stored as software in memory 22 and can be executed by processor 24. Network management system 20 also receives measurement data from network 10 through network management system interface 26 via network. The data entering interface 20 is comprised of network management protocol messages 60.

As shown in FIG. 1B, each packet switching node 30 contained within network 10 includes network management module 40, which collects measurements of the total traffic arriving at node 30 from outside the network and the total outgoing traffic on each link 50 to which node 30 is connected. These traffic measurements are transmitted to network management system 20, which uses them in a method consistent with the present invention to estimate source-destination traffic in network 10.

Figure 2:
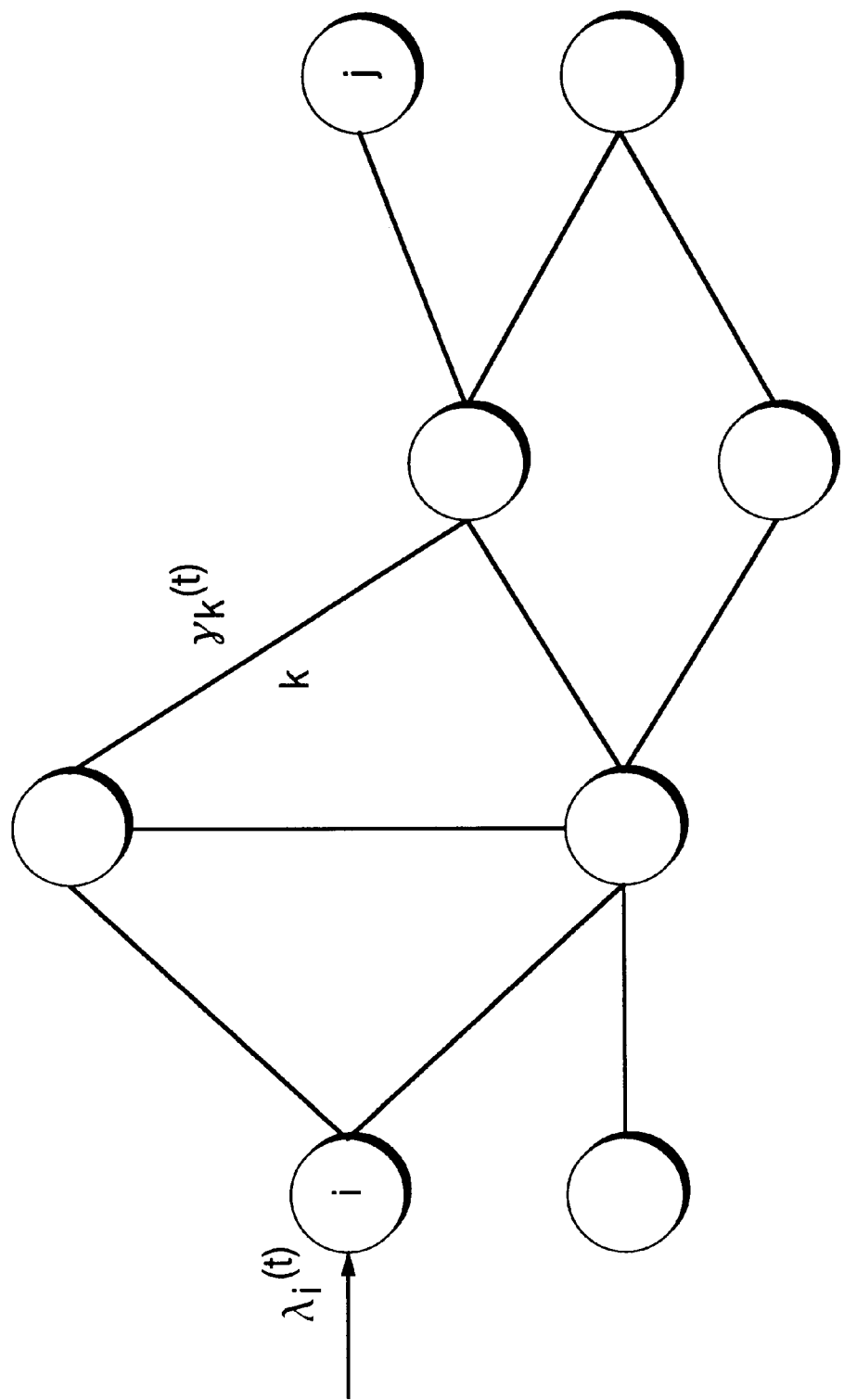
FIG. 2 illustrates network nodes and links and traffic measurements used in a method consistent with the present invention.

FIG. 2 illustrates the traffic measurements obtained from the network nodes in more detail. In a network of N packet switching nodes, eight of which are shown in FIG. 2 by way of example, and L links, each connecting two nodes, traffic measurements are made over T disjoint time periods, where T is a finite number. For every node i in the network, the rate of traffic arriving at node i from outside the network during time period t is measured as $\lambda_i^{(t)}$ packets/second. For every link k connecting two nodes in the network, the rate of traffic on the link during time period t is measured as $\gamma_k^{(t)}$ packets/second.

In addition to the traffic measurements from the network, an estimation method consistent with the present invention uses other data assumed to be known. In particular, the routes between sources and destinations are assumed to be known. There can be multiple routes between any particular source-destination node pair (ij). The method also assumes that links are directed. Hence, a duplex link is specified by a pair of directed links, and there can be multiple duplex links between a pair of nodes. The routes could be defined by a static routing table or computed by a routing algorithm such as a shortest paths algorithm.

When there are multiple routes that can be followed between a particular source-destination node pair (i,j), a method consistent with the present invention assumes that the traffic from node i to node j is split among the various routes according to a set of fixed ratios. The routes from source node i to destination node j may, in general, be different from the reverse routes. In a method consistent with the present invention, the proportion of the traffic originating at source node i and destined to node j that flows through link k, referred to herein as $r_{ijk}$, is assumed to be known. Therefore, the set of source nodes whose outgoing routes pass through link k, referred to herein as $A_k = \{i : r_{ijk} > 0, 1 \leq ij \leq N\}$, is also known. There is no route between a source i and itself, so $r_{iik}=0$, for $1 \leq i \leq N$. Note that $0 \leq r_{ijk} \leq 1$, for all i,j, and k. Also note that if there is only a single route from source node i to destination node j, then $r_{ijk}=1$ if the route uses link k and $r_{ijk}=0$ otherwise.

Figure 3:
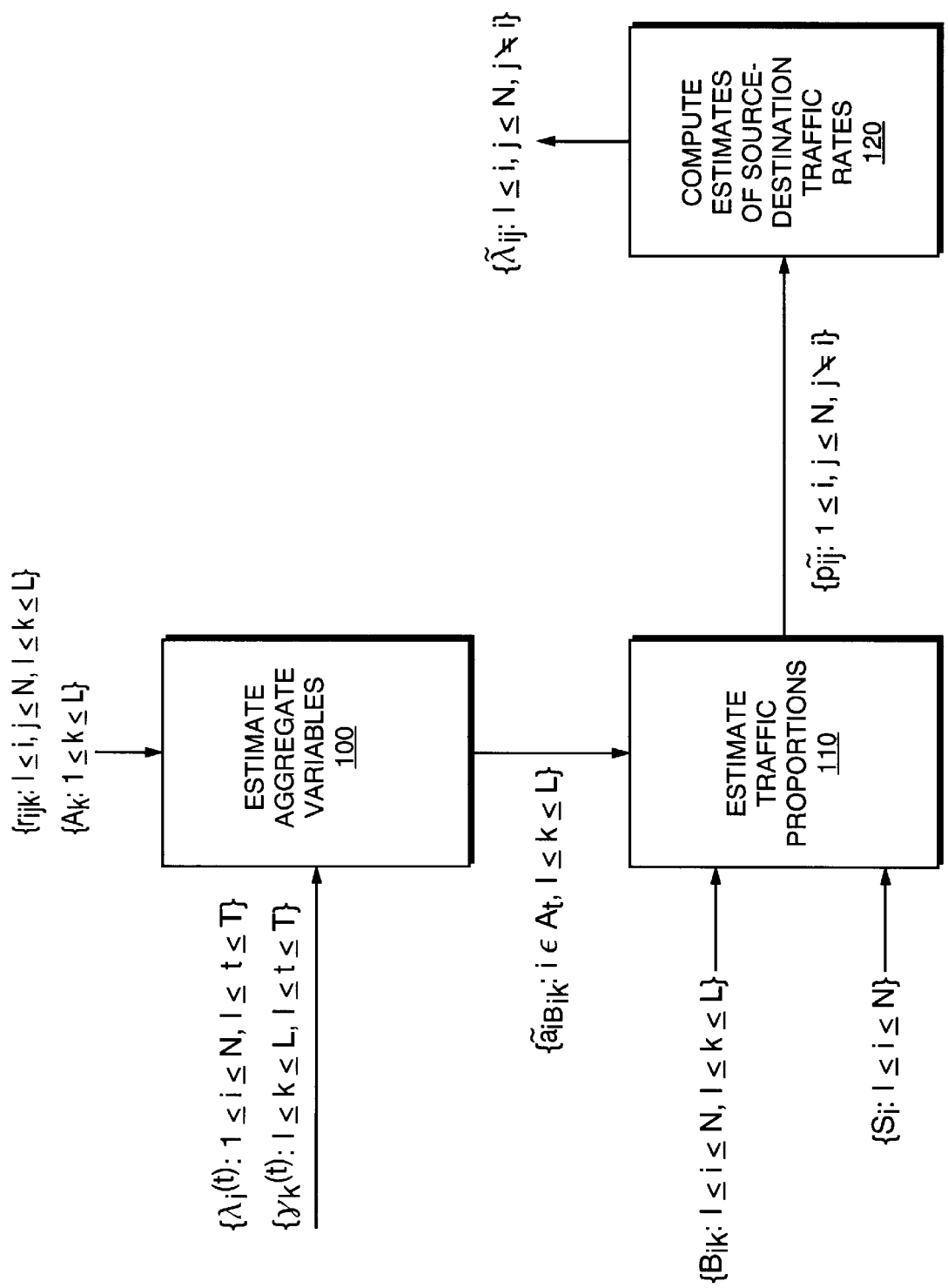
FIG. 3 is a flow diagram of a method for estimating source-destination traffic consistent with the present invention.

FIG. 3 is a high-level flow diagram of a decomposition method for estimating source-destination traffic consistent with the present invention. As shown in FIG. 3, $\lambda_i^{(t)}$ and $\gamma_k^{(t)}$ are measured over T time periods for all sources i and all links k in the network and are inputs to the estimation process. Also, the known routing proportions $r_{ijk}$ and the known set of source nodes $A_k$ are inputs to the estimation process. An estimation method consistent with the present invention includes three basic steps: estimating intermediate aggregate variables (step 100), which will be described in more detail below, estimating source-destination traffic proportions in the network (step 110), and using the estimated traffic proportions to compute an estimate of the source-destination traffic rate matrix, referred to herein as $\{\lambda_{ij} : 1 \leq i \leq N, 1 \leq t \leq T\}$, where $\lambda_{ij}$ is the estimated average traffic rate (packets/second) going from node i to node j (step 120). A mathematical basis for a method consistent with the present invention will now be presented, followed by more details of the steps shown in FIG. 3.

In a time period t, the total source-destination traffic rate originating at node i ($1 \leq i \leq N$) that goes from node i to node j ($1 \leq j \leq N$) is given by $\rho_{ij}^{(t)} \lambda_i^{(t)}$ packets/second, where $\rho_{ij}^{(t)}$ is the proportion of the traffic rate going from node i to node j in time period t, and where $$p_{ij}^{(t)} \geq 0, p_{ii}^{(t)} = 0, \text{ and } \sum_{(j=1)}^{(N)} p_{ij}^{(t)} = 1.$$

These proportions, numbering N(N−1), are initially unknown. The packet loss in the network is assumed to be negligible.

Also in time period t, the sum of the average traffic proportions from node i through link k to nodes j ∈J. where J is some set of destination nodes, is referred to herein as the aggregate variable $\alpha_{iJk}^{(t)}$. In terms of $\rho_{ij}^{(t)}$ and $r_{ijk}$, the aggregate variable can be written as $$a_{iJk}^{(t)} = \sum_{j \in J} p_{ij}^{(t)} r_{ijk}. \tag{1}$$

Using the aggregate variable, the following traffic equation may be written for link $$k : \gamma_k^{(t)} = \sum_{i \in A_k} \lambda_i^{(t)} a_{iB_{ik}k}^{(t)}, \tag{2}$$

where $A_k = \{i : r_{ijk} > 0, 1 \leq i, j \leq N\}$ and $B_{ik} = \{j : r_{ijk} > 0, 1 \leq j \leq N\}$, where $1 \leq k \leq L$ and $1 \leq i \leq N$. The set $A_k$ is the set of source nodes whose outgoing routes pass through link k. The set $B_{ik}$ is the set of destination nodes for routes that originate at node i and pass through link k. In equation (2), $\gamma_k^{(t)}$ and $\lambda_i^{(t)}$ are known from traffic measurements in time period t. The set of unknowns is $$\{a_{iB_{ik}k}^{(t)} : i \in A_k\}.$$

The number of unknowns is $|A_k|$, where the notation $|A_k|$ denotes the number of elements in the set $A_k$. Note that $|A_k| \leq N$ N since there are N source nodes in total. Using the set of destination nodes $B_{ik}$, equation (1) can be rewritten as:

$$a_{iB_{ik}k}^{(t)} = \sum_{j \in B_{ik}} p_{ij}^{(t)} r_{ijk}. \tag{3}$$

Defining $\alpha_{iJk}$ to be an estimate of the aggregate proportion of the traffic rate originating at node i that goes to nodes j ∈J and which flows through link k over T time periods, and defining $\rho_{ij}$ to be an estimate of the proportion, over T time periods, of the traffic rate originating at node i that goes from node i to node j, equation (2) may be rewritten as:

$$\gamma_k^{(t)} + e_k^{(t)} = \sum_{i \in A_k} \lambda_i^{(t)} \tilde{a}_{iB_{ik}k}, \tag{4}$$

where $e_k^{(t)}$ is an error term that is introduced to ensure mathematical correctness. Similarly, equation (3) may be rewritten as:

$$\tilde{a}_{iB_{ik}k} + f_i = \sum_{j \in B_{ik}} \tilde{p}_{ij} r_{ijk}, \tag{5}$$

where $f_i$ is an error term.

A method consistent with the present invention for estimating the source-destination traffic matrix in a packet-switched network is based directly on equations (4) and (5). The unknown variables $\alpha_{iB_{ik}k}$ and $\rho_{ij}$ can be estimated by setting up and solving LP problems. Each LP problem may be solved using well-known standard techniques or commercially available software, e.g., ILOG's CPLEX 6.0. Referring once again to FIG. 3, the output of a first estimation step (step 100) is an estimate of the aggregate variables, i.e., $\alpha_{iB_{ik}k}$. The output of a second estimation step (step 110) is an estimate of the source-destination traffic proportions, i.e., $\rho_{ij}$. Estimated traffic proportions are then used to compute estimated source-destination traffic rates (step 120).

In setting up LP problems for estimating the unknown variables, the following notational conventions are used. The positive column vectors e+ and e− denote positive and negative error terms, respectively. 1 and 0 denote compatible vectors of ones and zeroes, respectively. x denotes the set of unknowns corresponding to $$\{\tilde{a}_{iB_{ik}k} : i \in A_k\}, x^{(i)}$$

denotes the column vector of unknowns corresponding to $\{\rho_{ij} : 1 \leq j \leq N, j \neq i\}$, b denotes a compatible column vector of constants, and A denotes a matrix of constant coefficients. Also, $S_i$ denotes the set of links that are used by the routes that originate at node i, i.e., $S_i = \{k : r_{ijk} = 1, 1 \leq j \leq N, 1 \leq k \leq L\}$.

A first LP problem is set up and solved to estimate the aggregate variables $\alpha_{iB_{ik}k}$ for each link k (step 100 in FIG. 3).

The inputs to the LP problem are the known traffic proportions $r_{ijk}$ and the known set of source nodes $A_k$ for $1 \leq k \leq L$ and $1 \leq i \leq N$, as well as the traffic measurements $\gamma_k^{(t)}$ and $\lambda_i^{(t)}$ taken over T time periods. The aggregate variables are estimated using an LP problem as follows:

For $1 \leq k \leq L$:
If $|A_k| > 0$:
Arrange $$\left\{ \gamma_k^{(t)} = \sum_{i \in A_k} \lambda_i^{(t)} \tilde{a}_{iB_{ik}k} : 1 \leq t \leq T \right\}$$

in the standard form $Ax=b$, where x corresponds to the set of unknowns $$\{\tilde{a}_{iB_{ik}k} : i \in A_k\}$$

and b corresponds to the set of known constants $\{\gamma_k^{(t)} : 1 \leq t \leq T\}$.

LP Problem:
Find a solution $[x, e^+, e^-]$ which minimizes $1(e^+ + e^-)$ subject to the constraints:
$Ax = b + e^+ - e^-$
$O^t \leq x \leq 1^T$
$e^{30} \geq O^T$
$e^- \geq O^T$ By finding, for $1 \leq k \leq L$, a solution for x, or $$\{\tilde{a}_{iB_{ik}k} : i \in A_k\},$$

the method shown in FIG. 3 estimates the aggregate proportion of the traffic rate over T time periods originating at node i that flows through link k and goes to nodes in the set $\{B_{ik} : 1 \leq i \leq N, 1 \leq k \leq L\}$, i.e., the set of destination nodes for routes that originate at node i and pass through link k.

The method shown in FIG. 3 next uses the output of step 100, i.e., the estimated aggregate variables $$\tilde{a}_{iB_{ik}k},$$

to estimate the source-destination traffic proportions $\rho_{ij}$. In step 110, a second LP problem is set up and solved to estimate the set of traffic proportions $\{\rho_{ij} : 1 \leq j \leq N, j \neq i\}$ for each node i. The inputs to the LP problem are the estimated aggregate variables $\alpha_{iB_{ik}k}$ from step 100, as well as the known set $\{B_{ik} : 1 \leq i \leq N, 1 \leq k \leq L\}$ (the set of destination nodes for routes that originate at node i and pass through link k) and the known set $\{S_i : 1 \leq i \leq N\}$ (the set of links that are used by the routes that originate at node i). The traffic proportions are estimated using an LP problem as follows:

For $1 \leq i \leq N$:
Arrange $$\left\{ \tilde{a}_{iB_{ik}k} = \sum_{j \in B_{ik}} \tilde{p}_{ik} r_{ijk} : k \in S_i \right\}$$

in the standard form $Ax^{(i)} = b$, where $x^{(i)}$ corresponds to the set of unknowns $\{\rho_{ij} : j \neq i, 1 \leq i,j \leq N\}$ and b corresponds to the set of known estimates $$\{\tilde{a}_{iB_{ik}k} : k \in S_i\}.$$

LP Problem:
Find a solution $[x^{(i)}, e^+, e^-]$ which minimizes $1(e^+ + e^-)$ subject to the constraints:
$Ax^{(i)} = b + e^+ - e^-$
$O^T \leq x^{(i)} \leq 1^T$
$1x^{(i)} = 1$
$e^+ \geq O^T$
$e^- \geq O^T$ By finding a solution for $x^{(i)}$, $1 \leq i \leq N$, or $\{\rho_{ij} : j \neq i, 1 \leq i,j \leq N\}$, the method shown in FIG. 3 estimates the source-destination traffic proportions $\rho_{ij}$.

The method in FIG. 3 then uses the output of step 110, ie., the estimated source-destination traffic proportions $\rho_{ij}$, to compute $\lambda_{ij}$, estimates of the source-destination traffic rates, as follows (step 120):

For $1 \leq i \leq N$:

Thus, a decomposition method consistent with the present invention yields estimates for the set of average traffic rates $\{\lambda_{ij} : 1 \leq i,j \leq N, i \neq J\}$ (the source-destination traffic matrix).

Advantageously, the maximum number of unknowns that needs to be solved simultaneously in the LP problems of the decomposition method is Max $\{N-1, |A_1|, \ldots, |A_L|\}$, where $A_k$ denotes the set of source nodes whose outgoing routes pass through link k, and where the notation $|A_k|$ denotes the number of elements in the set $A_k$. Therefore, the maximum number of unknowns is less than or equal to N since, as stated above, $|A_k| \leq N$. Hence, a decomposition method consistent with the present invention scales with the size of the network and can be used to efficiently estimate source-destination traffic rates even in the case of large networks. Because of its scalability and efficiency, a method consistent with the present invention can be used in a real-time estimation process. The method also always provides a physically valid estimate since it includes the constraints $O^T \leq x^{(i)} \leq 1^T$ and $1x^{(i)} = 1$.

Also note that minimizing $1(e^+ + e^-)$, subject to $e^+ \geq O^T$ and $e^- \geq O^T$, is equivalent to minimizing the sum of the absolute errors. Defining $e = e^+ - e^-$, the sum of the absolute errors is $1|e|$. When $1(e^+ + e^-)$ is minimized subject to the constraints, the ith component of either $e^+$ or $e^-$ must be equal to 0, for all feasible i. Hence, when $1(e^+ + e^-)$ is minimized, $1|e|$ is also minimized because $1|e| = 1(e^+ + e^-)$.

Methods and systems consistent with the present invention thus provide a computationally efficient decomposition method to estimate the existing source-destination traffic demands in real-time using aggregate traffic measurements on point-to-point links. The decomposition method solves a related set of LP problems to obtain an estimated source-destination traffic matrix. Estimating the traffic matrix rather than measuring it directly avoids the previously described practical problems of measuring individually the traffic between a large number of sources and destinations. The computational efficiency of the inventive decomposition method enables the traffic matrix estimation to be made in real-time. The decomposition method also scales with network size (i.e., number of nodes and links) so that it may be readily applied to networks of a large size.

It will be apparent to those skilled in this art that various modifications and variations can be made to the source-destination traffic estimation scheme of the present invention without departing from the spirit and scope of the invention. It will also be apparent to those skilled in the art that the estimation method of the present invention may be used for other purposes related to packet-switched networks that require source-destination traffic, e.g., adaptive routing and flow control in a packet-switched communication network. Other embodiments of the invention will be apparent to those skilled in this art from consideration of the specification and practice of the invention disclosed herein. It is intended that the specification and examples be considered exemplary only, with the true scope and spirit of the invention being indicated by the following claims.

We claim:

1. A method for estimating source-destination traffic for a packet-switched communications network, wherein the network includes a plurality of nodes, including a plurality of source nodes and a plurality of destination nodes, the nodes interconnected by a plurality of links, and wherein the network includes a plurality of traffic routes, each route originating at a source node and terminating at a destination node and including at least one link, the method comprising the steps of:

providing a source traffic rate measurement for traffic coming into the network at each source node during each of a plurality of time periods and a link traffic rate measurement for traffic on each of the plurality of links belonging to routes originating at the source nodes during each time period;

determining, for each of the plurality of links belonging to routes originating at the source nodes, an estimate of a proportion of the link traffic rate corresponding to traffic originating from the source nodes over the plurality of time periods based on the link traffic rate measurement and the source traffic rate measurement during each time period;

determining an estimate of a traffic rate proportion for traffic originating from each source node corresponding to traffic terminating at each destination node over the plurality of time periods based on the proportion of the link traffic rate corresponding to traffic originating from the source nodes for each of the plurality of links belonging to routes originating from the source nodes; and computing a rate of traffic from each source node to each destination node based on the source traffic rate measurement during each of the plurality of time periods and the traffic rate proportion for traffic originating from each source node corresponding to traffic terminating at each destination node over the plurality of time periods.

2. The method of claim 1, wherein the step of determining an estimate of a proportion of the link traffic rate corresponding to traffic originating from the source nodes includes the substep of solving a linear programming problem.

3. The method of claim 1, wherein the step of determining an estimate of a traffic rate proportion for traffic originating from each source node corresponding to traffic terminating at each destination node includes the substep of solving a linear programming problem.

4. The method of claim 1, wherein, for each destination node and link, a traffic rate proportion for traffic originating at a source node and terminating at a destination node that flows on each link is stored in memory in a network management system, the method further comprising the step of retrieving from memory the traffic rate proportion for traffic originating at the source node and terminating at the destination node that flows on each link, and wherein the step of determining an estimate of a traffic proportion rate for traffic originating from each source node corresponding to traffic terminating at each destination node is further performed based on the retrieved traffic rate proportion.

5. In a packet-switched communications network, wherein the network includes a plurality of nodes, including a plurality of source nodes and a plurality of destination nodes, the nodes interconnected by a plurality of links, and wherein the network includes a plurality of traffic routes, each route originating at one of the plurality of source nodes and terminating at one of the plurality of destination nodes and including at least one of the plurality of links, a method for estimating traffic from each source node to each destination node, the method comprising the steps of:

measuring a source traffic rate for traffic coming into the network at each source node during each of a plurality of time periods;

measuring a link traffic rate for traffic on each of the plurality of links belonging to routes originating at the source nodes during each time period;

determining, for each of the plurality of links belonging to routes originating at the source nodes, an estimate of a proportion of the link traffic rate corresponding to traffic originating from the source nodes over the plurality of time periods based on the link traffic rate measurement and the source traffic rate measurement during each time period;

determining an estimate of a traffic rate proportion for traffic originating from each source node corresponding to traffic terminating at each destination node over the plurality of time periods based on the proportion of the link traffic rate corresponding to traffic originating from the source nodes for each of the plurality of links belonging to routes originating at the source nodes; and computing a rate of traffic from each source node to each destination node based on the source traffic rate measurement during each of the plurality of time periods and the traffic rate proportion for traffic originating from each source node corresponding to traffic terminating at each destination node over the plurality of time periods.

6. The method of claim 5, wherein the step of determining an estimate of a proportion of the link traffic rate corresponding to traffic originating from the source nodes includes the substep of solving a linear programming problem.

7. The method of claim 5, wherein the step of determining an estimate of a traffic rate proportion for traffic originating from each source node corresponding to traffic terminating at each destination node includes the substep of solving a linear programming problem.

8. The method of claim 5, wherein, for each destination node and link, a traffic rate proportion for traffic originating at a source node and terminating at a destination node that flows on each link is stored in memory in a network management system, the method further comprising the step of retrieving from memory the traffic rate proportion for traffic originating at the source node and terminating at the destination node that flows on each link, and wherein the step of determining an estimate of a traffic proportion rate for traffic originating from each source node corresponding to traffic terminating at each destination node is further performed based on the retrieved traffic rate proportion.

9. A system for estimating traffic in a packet-switched network, wherein the network includes a plurality of source nodes and a plurality of destination nodes, the nodes interconnected by a plurality of links, and wherein the network includes a plurality of traffic routes, each route originating at a source node and terminating at a destination node, the system comprising:

an interface for receiving from the network a source rate traffic measurement for traffic coming into the network at each source node during each of a plurality of time periods and for receiving from the network a link traffic rate measurement for traffic on each of the plurality of links belonging to routes originating at the source nodes during each time period;

a memory comprising a traffic estimation program; and a processor utilizing the traffic estimation program to determine, for each of the plurality of links belonging to routes originating at the source nodes, an estimate of a proportion of the link traffic rate corresponding to traffic originating from the source nodes over the plurality of time periods based on the link traffic rate measurement and the source traffic rate measurement during each time period;

determine an estimate of a traffic rate proportion for traffic originating from each source node corresponding to traffic terminating at each destination node over the plurality of time periods based on the estimate of the proportion of the link traffic rate corresponding to traffic originating from the source nodes for each of the plurality of links belonging to routes originating at the source nodes; and compute a rate of traffic from each source node to each destination node based on the source traffic rate measurement during each of the plurality of time periods and the traffic proportion for traffic originating from each source node corresponding to traffic terminating at each destination node over the plurality of time periods.

10. A computer-readable medium containing instructions for estimating source-destination traffic for a packet-switched communications network, wherein the network includes a plurality of nodes, including a plurality of source nodes and a plurality of destination nodes, the nodes interconnected by a plurality of links, and wherein the network includes a plurality of traffic routes, each route originating at a source node and terminating at a destination node and including at least one link, by:

receiving from the network a source rate traffic measurement for traffic coming into the network at each source node during each of a plurality of time periods and for receiving from the network a link traffic rate measurement for traffic on each of the plurality of links belonging to routes originating at the source nodes during each time period;

determining, for each of the plurality of links belonging to routes originating at the source nodes, an estimate of a proportion of the link traffic rate corresponding to traffic originating from the source nodes over the plurality of time periods based on the link traffic rate measurement and the source traffic rate measurement during each time period;

determining an estimate of a traffic rate proportion for traffic originating from each source node corresponding to traffic terminating at each destination node over the plurality of time periods based on the estimate of the proportion of the link traffic rate corresponding to traffic originating from the source nodes for each of the plurality of links belonging to routes originating at the source nodes; and computing a rate of traffic from each source node to each destination node based on the source traffic rate measurement during each of the plurality of time periods and the traffic proportion for traffic originating from each source node corresponding to traffic terminating at each destination node over the plurality of time periods.

* * * * *